Nov. 11, 1969   J. W. GRATIAN   3,478,331
FREQUENCY MULTIPLICATION APPARATUS
Filed Jan. 3, 1967   2 Sheets-Sheet 1

INVENTOR.
JOSEPH WARREN GRATIAN
BY Raymond L. Owens
ATTY.

United States Patent Office 3,478,331
Patented Nov. 11, 1969

3,478,331
FREQUENCY MULTIPLICATION APPARATUS
Joseph W. Gratian, Rochester, N.Y., assignor to General Dynamics Corporation, a corporation of Delaware
Filed Jan. 3, 1967, Ser. No. 606,739
Int. Cl. G11b *9/00;* H03h *3/00*
U.S. Cl. 340—173                        10 Claims

ABSTRACT OF THE DISCLOSURE

A frequency multiplication apparatus employing a ferroacoustic memory storage device and logic means which permit samples to be taken at a first rate and stored in the ferroacoustic device and thereafter read out from the device at a higher second rate.

---

The present invention relates to information handling apparatus for providing a frequency multiplication function.

The invention is suitable for use in signal analysis systems, and moreover, it is particularly suited for use in speech signal analysis systems. Nevertheless, the invention may readily be adapted for use in other systems which require frequency multiplication.

One version of frequency multiplication apparatus currently in use employs a mechanical apparatus having a rotating reading head which scans information recorded on a moving tape. Such a frequency multiplication apparatus has a number of disadvantages, for example, cost, sensitivity, and mechanical complexity.

In view of the foregoing, it is an object of the invention to provide an improved frequency multiplication apparatus which eliminates the above-mentioned disadvantages of prior frequency multiplication arrangements.

Another object of the invention is to provide a solid state frequency multiplication apparatus which eliminates the need for moving mechanical parts.

A still further object of the invention is to provide a frequency multiplication apparatus which requires fewer memory storage elements than has generally been needed with prior frequency multiplication apparatus.

Briefly described, a frequency multiplication apparatus in accordance with the invention makes use of a ferroacoustic storage device having a storage line in which the coincident application at a discrete location or address, of a stress pulse and a field (an electric field in one version of ferroacoustic device and a magnetic field in another) will alter the hysteresis characteristic of the line at the discrete location, so as to be representative of the magnitude of the intensity of the field. The field intensity, in turn, is a function of the magnitude of a sample which may, for instance, be taken from the waveform of a speech signal. With a ferroacoustic device of this variety, the samples may be stored relatively closer to each other and so a traveling stress pulse may be used to read out the stored samples at a much higher frequency than that at which they were recorded.

In accordance with one embodiment of the invention, a single ferroacoustic memory device need be used to record samples, each representative of a digital bit of information. Logic means are arranged to propagate a stress pulse along the line and thereafter, apply a field coincidentally with a stress pulse at that location to thereby record a sample. With this arrangement, it is the polarity of the applied field which is indicative as to whether or not the location will have its hysteresis characteristic altered to be representative of a digital bit having a value of "1" or "0." Thereafter, the traveling stress pulse may be used to read out the samples which were previously recorded on the line.

In accordance with another embodiment of the invention, two ferroacoustic memory devices are used in combination, so that initially the first device will be used for storing sample signals, whereas the second device will at this time be used for reading out previously stored samples. After the first device has had a predetermined number of samples stored, the second device is erased and newly taken samples are recorded in it while readout is taken from the first.

The invention itself, both as to its organization and method of operation, as well as the foregoing and other objects and advantages thereof, will become more readily apparent from a reading of the following description taken in conjunction with the accompanying drawings in which.

Figure 1:
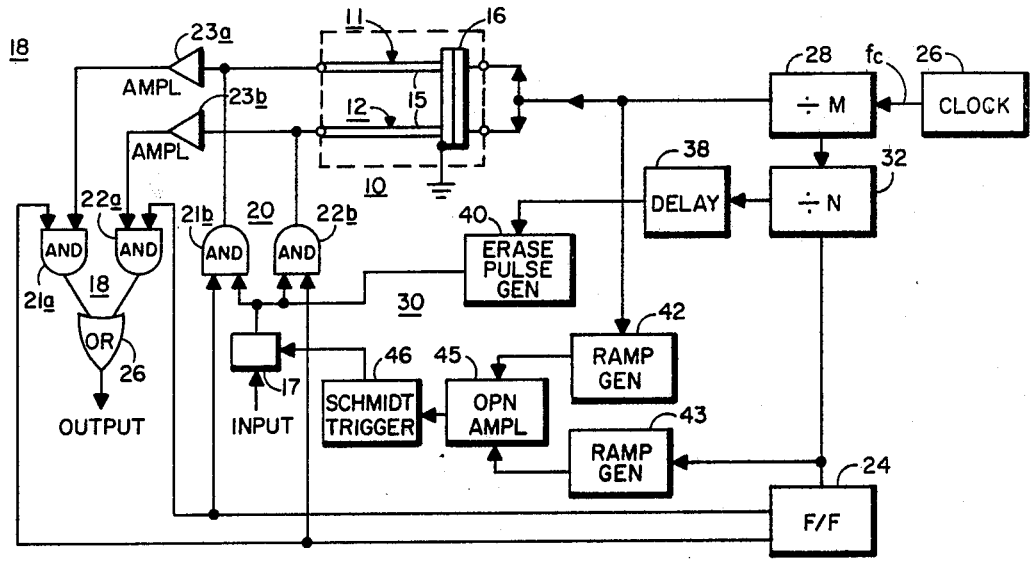
FIG. 1 is a diagrammatic view of a frequency multiplication apparatus embodying the present invention, including a block diagram of logic circuitry, and schematically showing two ferroacoustic memory storage devices.

Referring first to FIG. 1, an exemplary frequency multiplication apparatus 10 is shown which includes two ferroacoustic memory devices 11 and 12. Each device has an elongated storage line member 15 and a single transducer 16 common to both lines which propagates a stress pulse down both the lines 15 when actuated by a pulse. The field is provided by supplying an axial current to a selected one of the lines 15. By an axial current is meant a current flowing axially along the line. It should be noted that the transducer side of the lines 15 is connected to ground to complete the current paths through the lines and through the transducer. For a more complete explanation of the means of applying a field across the line, reference may be made to U.S. patent application, Ser. No. 533,770, filed Mar. 4, 1966 in the name of Joseph Warren Gratian. This application describes a ferroacoustic device which may be used in the practice of this invention and which has its line (similar to line 15) comprised of a magnetostrictive material, the hysteresis characteristic of which is altered by the coincident application of a magnetic field and a stress pulse.

A second version of a ferroacoustic device which may be used in the practice of the invention has a line (similar to line 15) comprised of a ferroelectric type material which in response to a coincidently applied electric field and a stress pulse has its hystheresis characteristic altered. Such a line is described in U.S. patent application, Ser. No. 341,297, filed Jan. 30, 1964 in the name of Joseph Warren Gratian.

An analog type signal may be accurately represented by varying the intensity of the field applied across the line 15. Thus, the altered hysteresis characteristic of the line 15 is at a discrete location which may be representative of an analog sample. This recorded sample, may, when desired, be read out by a traveling stress pulse.

Assume for the moment that the device 12 will first be used to record samples whereas the device 11 will be used for reading out previously stored samples. The apparatus 10 will first record at a discrete location along the line 15 of the device 11 a sample which, for illustration purposes say, is taken from a speech signal by a sampler or sampling gate 17, while at the same time the device 12 will have samples previously recorded on its line 15 read out and delivered to some appropriate output device. When the device 11 has been completely updated with a predetermined number of samples (actually the number is N as will be seen shortly), the device 12 will be erased and thereafter, a new sample will be recorded in the device 12 while readout will be taken from the device 11.

The apparatus 10 is provided with a read gate 18 and a write gate 20; each of these gates has two lines, one connected to each of the devices 11 and 12. At any given time, the gate 18 will be coupled to only one of the devices and the gate 20 will be coupled to the other. Therefore, in the initial condition mentioned above, the write gate 20 will, when the sampling gate 17 is actuated, permit samples to be applied as an input to the storage device 12 where they are recorded at discrete locations along the line 15. No communication will at this time be provided between the gate 20 and the device 11. Moreover, at this time, the read gate 18 will be coupled to the output of the device 11 but its communication link with the device 12 will be shut off.

Each of the gates 18 and 20 is formed by two AND gates 21a and b and 22a and b, respectively, with each of the AND gates 21 being coupled to the device 11 and each of the AND gates 22 being coupled to the device 12. Amplifiers 23a and b are interposed between the AND gates 21a and 22a of the gate 18 and their respective ferroacoustic device and are adapted to amplify the outputs from the devices 11 and 12 to a suitable level. Each of the AND gates receives an input from a flip-flop 24 so that each time the flip-flop 24 is triggered, the gates 18 and 20 will be alternately coupled to different ones of the devices 11 and 12.

The operation of the gate 18 is similar to that of gate 20 and need only be described to appreciate the operation of both the gates. Assuming for the moment that readout is being accomplished from the device 11, at this time the flip-flop 24 will provide a level which will enable the AND gates 21a and 22b and inhibit the AND gates 22a and 21b. When the flip-flop 24 is triggered, the AND gates 22a and 21b will be enabled and the gates 21a and 22b will be inhibited. The output of each of the AND gates 21a and 22b in the gate 18 are coupled to an OR gate 26, from which the read gate 18 output is derived.

A stable clock pulse generator 26 applies its output to a counter 28 and a delay device 30. The delay device 30, after a predetermined time interval briefly actuates the sampler 17, permitting a sample to be applied by way of the read gate 20 to the appropriate ferroacoustic device 11 or 12 which will store the sample at a predetermined location of line 15. The operation of delay device 30 will be more fully described later.

The counter 28 is a divide by M ($\div M$) counter; that is to say for each M pulses developed by the clock 26, the counter 28 will produce an output. More particularly, the counter 28 applies its output in three directions, first to a second counter 32, second to the delay device 30, and third to actuate the common transducers 16 thereby causing stress pulses to simultaneously travel down both of the lines 15.

The counter 32 is a divide by N ($\div N$) counter. Upon reaching a count of N, the counter 32 actuates the flip-flop 24 which in turn simultaneously actuates the read gate 18 and the write gate 20 as described above. In addition, the counter 32 provides an input to a delay gate 38 which after a short delay interval triggers an erase pulse generator 40. As shown, the erase pulse generator 40 is in communication with the input to the write gate 20 and when it is actuated, the gate 20 will already have been enabled by the flip-flop 24 so that the erase signal produced by the generator 40 will erase the samples from the line from which readout had previously been taken. Actually, information stored on the line may be erased by any one of several techniques. If the line is comprised of a magnetostrictive material, then the erase pulse generator 40 may apply dampening electric oscillations to the line, the amplitude of which being sufficient to erase the line. Simultaneously, if the line is ferroelectric, it may be erased by applying an alternating electric field across the line.

Viewed another way, each of the lines 15 of the devices 11 and 12 has N distinct storage locations and so when MN signals are generated by the clock 26, the counter 32 actuates the flip-flop 24, causing the gates 18 and 20 to switch and also actuates the delay gate 30 causing the erase pulse generator 40 to erase the line which was previously being used for readout.

For a specific example, assume that the number of stored samples N is to be 100 and that the clock rate of $f_c$ of the gate 26 is 1 mc. and the multiplication factor M of the gate 28 is 100. Then the sampling rate will be 10 kc. given by the formula $f_c/M$ and $MN/f_c$ (10 microseconds) will be the time interval of the analog signal from which the 100 samples will be taken.

Turning now to the delay device 30, it includes two ramp generators 42 and 43, respectively, with the generator 42 receiving an input signal from the counter 28 and the generator 43 an input from the counter 32. Each of the outputs from the ramp generators is delivered as an input to an operational amplifier 45 which acts as a summing device and in turn applies its output to a Schmitt trigger 46. When the output signal from the amplifier 45 is of at least a predetermined threshold level it will actuate the Schmitt trigger which provides a brief strobing input to the sampler 17. Each successive output produced by the trigger 46 is progressively delayed in time from its input from the counter 28 by a duration which corresponds to the time it takes a stress pulse actuated by the transducer 16 to travel the distance between the transducer 16 and the next location in which a new sample is to be recorded.

Figure 1A:
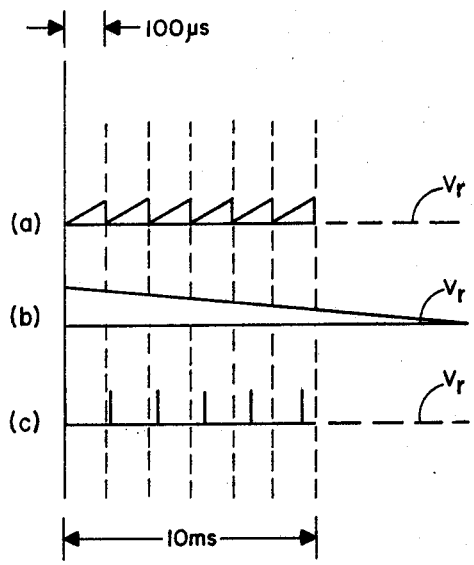
FIG. 1a is a graph which depicts the waveforms developed by a delay device included in the apparatus of FIG. 1.

The operation of the device 30 is readily understood with reference to FIG. 1a. Assuming that the apparatus is operating at the rates of the specific example set forth above, every 10 microseconds the generator 43 will be actuated by the counter 32 and will produce an output signal which has some high initial voltage level which progressively diminishes to some reference level $V_r$ after 10 milliseconds, whereas the ramp generator 42 will be actuated every 100 microseconds by the counter 28 and produces a saw tooth type waveform, in which the initial level $V_r$ increases rapidly to a predetermined maximum level. Accordingly, as shown, when the operational amplifier 45 adds these two waveforms it will produce outputs which reach the threshold level that are progressively delayed from the actuating pulse of the counter 28 so as to correspond to the next storage location on the line. Viewed another way, the delay device 30 after being signaled by the counter 28 must wait for an exact time interval corresponding to a storage location, the interval being equal to the distance from the transducer 16 to the storage location divided by the propagation velocity of the stress pulse. Of course, the length of the line 15 must be selected so that a stress pulse will completely traverse the line before the next stress pulse is produced. However, the delay provided by the device 30 could also be provided by other arrangements such as a decoding matrix of the variety which will be described hereinafter in connection with FIG. 2.

Figure 2:
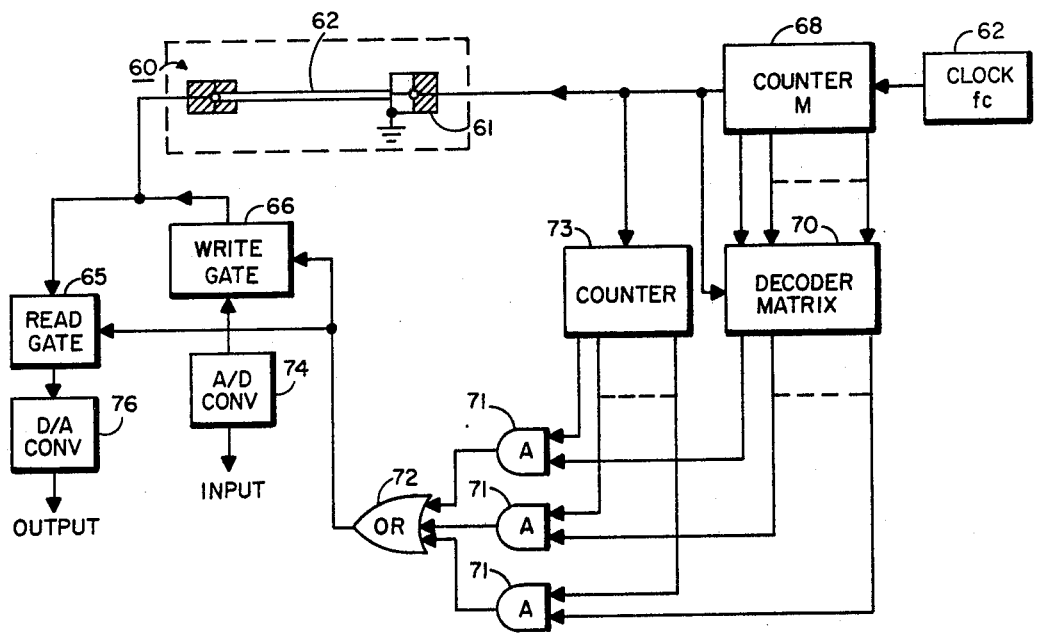
FIG. 2 is a diagrammatic view of a second embodiment of the present invention, the representation including a block diagram of logic circuitry and a schematic showing of a ferroacoustical memory device.

Turning now to FIG. 2, a single ferroacoustic storage device 60 is shown which contains a transducer 61, a storage line 62, containing N storage locations and all of the other necessary elements previously mentioned. A clock pulse generator 62 drives a counter 68 which is a divide by M counter, similar to the counter 28 of FIG. 1. Upon M counts, the counter 68 applies an actuating pulse to the transducer 61 and injects an input into a decoder matrix 70. In response to its input, the decoder matrix 70 applies a delayed output to an OR gate 72. As with the previous embodiment, upon each successive pulse developed by the counter 68, the decoder matrix 70 will wait for an interval corresponding to the storage location where a sample is to be recorded before producing an output. For illustration purposes, assume that only one sample will be recorded for each stress pulse that is developed, and moreover, that samples will be recorded in successive locations. Therefore, (N−1) samples will be read out for each sample that is stored.

The decoder matrix 70 may be a diode matrix which has one hundred output lines, with each output line corresponding to a storage location. Each output line is provided as an input to a separate AND gate 71. Another input to each of the AND gates 71 comes from a counter 73 which keeps account, up to the number N(100) of the number of pulses developed by the counter 68. Just after the counter 73 reaches a count of N, it resets itself to zero.

Other inputs to the matrix are also provided from various flip-flop stages of the counter 68. Accordingly, after each output from the counter 68, the matrix 70 will sequentially gate on and off each of its one hundred outputs. However, the counter 73 at this time will provide an enabling input to only one of the AND gates 71, and only this gate will inject an input into the OR gate 72 when its corresponding output line from the matrix 70 is briefly enabled. At a given time, the output line from the counter 73, which is enabled at this time, corresponds to the count held by the counter 73.

It should be clear that other arrangements could be employed to properly address the storage line instead of a decoder matrix. For example, the analog delay gate 30 which was described in connection with FIG. 1 could also be employed here.

As with the previous arrangement, there is provided a read gate 65 and a write gate 66. However, with this arrangement, the locations on the line 62 will have their hysteresis characteristic altered so as to be representative of a digital bit of information. More particularly, if the field applied to the line 62 is in one sense (which is determined by a current of a positive polarity), the field intensity will be of such a nature that it will not substantially alter the hysteresis characteristics of the line, unless it is applied in coincidence with a stress pulse. At coincidence, it will alter the hysteresis character of that location so as to be representative of a particular digital bit. For example, assume that a location of the line had previously had its hysteresis character altered by means of a positive field so as to represent the "1" bit. If a new positive field were applied coincidentally with a stress pulse at this location, it would somewhat alter the hysteresis characteristic but not change its representation as a "1" bit. Whereas, if in coincidence with a stress pulse, a negative current were applied representing the "0" bit, it would substantially alter the hysteresis characteristic of the location from a positive to a negative character so as to represent the "0" bit. During readout, if the location has a "1" bit stored therein, a positive output signal would be applied to the gate 65 and if a "0" bit were stored, a negative output would be applied.

As shown, there is provided an analog-to-digital converter 74 coupled to the write gate 66 which gates digital information in the form of a positive or negative current pulse which flows down the line and establishes the field. There is provided an output digital-to-analog converter 76 which receives information readout from the line and converts it into analog data.

Summarizing, the counter 68 develops output pulses which actuate the transducer and causes stress pulses to be generated which propagate axially along the storage line. The pulses also actuate the matrix 70. The samples stored on the line are read out until the OR gate 72 produces an output which disables the read gate 65 and enables the write gate 66, momentarily interrupting the readout process in time to permit a new sample to be stored. Thereafter, readout resumes as the stress pulse continues along the line. This sequence is continuous.

Figure 3:
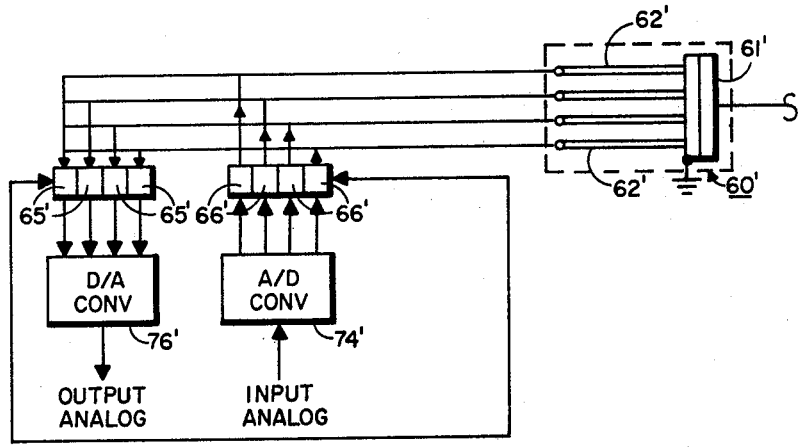
FIG. 3 is a diagrammatic view showing several elements in a further embodiment of the invention similar to the embodiment shown in FIG. 2.

Turning now to the embodiment shown in FIG. 3, a plurality of ferroacoustic storage devices $62^1$, read gates $65^1$, and write gates $66^1$ are provided. Each device $62^1$ is adapted to receive an input from an associated write gate $66^1$ analog-to-digital converter $74^1$. Digital samples are stored in parallel in corresponding locations on the several lines shown in the manner described in connection with FIG. 2. Readout from the devices $60^1$ are, of course, taken from the several lines $62^1$. When the write gate $66^1$ are enabled at this time, a digital-to-analog converter $76^1$ will receive the digital samples (in parallel) and produce a corresponding analog output.

While various embodiments of the invention have been described, variations thereof and modifications therein within the spirit of the invention will undoubtedly suggest themselves to those skilled in the art. Accordingly, the foregoing descriptions should be taken as illustrative and not in any limiting sense.

What is claimed is:

1. A frequency multiplication apparatus comprising
   (a) a ferroacoustic memory storage device including a storage line in which the hysteresis characteristic of a discrete location is altered when subject to the coincident application of a field and a traveling stress pulse,
   (b) a source of analog signal samples,
   (c) means for actuating said device at a predetermined rate for repeatedly causing stress pulses to travel along said line,
   (d) means for generating drive pulses progressively delayed with respect to each other each after a successive one of said stress pulses,
   (e) first gate means coupled to said source of samples and said generating means being enabled by said drive pulses to apply a field across said line representative of a sample,
   (f) second gate means coupled to said line and which when enabled permits a traveling stress pulse to readout the samples stored on said line, and
   (g) logic means for enabling said second gate means after and alternately with said first gate means.

2. A frequency multiplication apparatus comprising,
   (a) a ferroacoustic memory storage device including a storage line in which the hysteresis characteristic of a discrete location is altered when subject to the coincident application of a field and a traveling stress pulse, the hysteresis characteristic being altered as a function of the polarity of the applied field to represent digital information; a transducer for propagating a stress pulse along said line; and means for applying a field across said line,
   (b) a source of samples of different polarity representative of digital information,
   (c) first gate means which when enabled is coupled to said line to permit a traveling stress pulse to read out information stored in said line,
   (d) second gate means which when enabled couples said source to said field applying means,
   (e) a source of clock pulses, and
   (f) logic control means responsive to a predetermined number of said clock pulses to successively, alternately enable said first gate means and said second gate means, each of said succession of alternate enabling of said first and second gate means occurring after a greater time delay.

3. The invention as set forth in claim 2 wherein said logic control means includes first counting means responsive to a predetermined number of clock pulses to generate a signal which actuates said transducer, and delay means responsive to a predetermined number of clock pulses and a predetermined time interval after said transducer has been actuated for simultaneously enabling one of said gate means while disabling the other said gate.

4. The invention as set forth in claim 3 wherein said source of samples is provided by a digital-to-analog converter.

5. The invention as set forth in claim 4 wherein said delay means is adapted to enable said second gate means for a time interval sufficient to permit said field applying means to store a new sample at a discrete location.

6. The invention as set forth in claim 3 wherein said delay means includes decoding matrix means responsive to said first counting means signal and adapted to provide a delayed output signal which corresponds to a discrete location on said line, and OR gate means coupling said delayed output signal to said first and second gates.

7. The invention as set forth in claim 3 including a plurality of ferroacoustic memory storage devices, a plurality of first gate means each associated with a particular ferroacoustic storage device, a plurality of second gate means each associated with a particular ferroacoustic device, said ferroacoustic devices being responsive to said counting means to produce traveling stress pulses and said first and second gate means each being responsive to said delay means.

8. A frequency multiplication apparatus comprising
(a) first and second ferroacoustic memory storage devices, each said device including a storage line in which the hysteresis characteristic of a discrete location is altered when subject to the coincident application of a field and a traveling stress pulse, the hysteresis characteristic being altered as a function of the intensity of the applied field, transducer means for propagating a stress pulse along said line, and means for applying a field across said line at an intensity indicative of the magnitude of an analog sample,
(b) a source of analog samples,
(c) first gate means which when coupled to a storage line permits a traveling stress pulse to read out information stored in said line and second gate means which when coupled to a device permits a storage sample to be applied to said field applying means,
(d) said first and second gate means each having a first operating state wherein said first gate means is coupled to said first device and said second gate means is coupled to said second device and a second operating condition wherein said second gate means is coupled to said first device and said first gate means is coupled to said second device,
(e) a source of clock pulses, and
(f) logic control means responsive to a predetermined number of said clock pulses to selectively actuate said first gate means causing it to be coupled to one of said devices and actuate said second gate means causing it to be coupled to the other said device.

9. The invention as set forth in claim 8 wherein said logic control means includes first counting means responsive to a predetermined number of clock pulses to generate a signal which actuates said transducer and delay means responsive to said first counting signal for actuating said second gate means at a time which corresponds to a storage location on said line.

10. The invention as set forth in claim 9 wherein said logic control means includes second counting means coupled to said first counting means and adapted to generate an output after receiving a number of inputs corresponding to a predetermined number of storage locations, a flip-flop responsive to said second counting means output for actuating said first and second gating means, and an erase pulse generator responsive to said second counting means and coupled to said second gate means for erasing one of said lines just after said first and second gates have been actuated.

References Cited
UNITED STATES PATENTS

| | | | |
|---|---|---|---|
| 3,362,019 | 1/1968 | Gratian et al. | 340—173 |
| 3,320,596 | 5/1967 | Smith | 340—173 |
| 3,339,188 | 8/1967 | Weinstein | 340—173 |

TERRELL W. FEARS, Primary Examiner

U.S. Cl. X.R.

333—30